(12) United States Patent
Gross et al.

(10) Patent No.: US 9,477,021 B2
(45) Date of Patent: Oct. 25, 2016

(54) GLAZING DESIGN WITH VARIABLE HEAT AND LIGHT TRANSMITTANCE PROPERTIES, DEVICE AND METHOD

(71) Applicant: KiloLambda Technologies Ltd., Tel-Aviv (IL)

(72) Inventors: Noam Gross, Kiryat Ono (IL); Ariela Donval, Rosh-Haayin (IL); Doron Nevo, Ra'anana (IL); Moshe Oron, Rehovot (IL)

(73) Assignee: KILOLAMBDA TECHNOLOGIES LTD., Tel Aviv (IL)

( * ) Notice: Subject to any disclaimer, the term of this patent is extended or adjusted under 35 U.S.C. 154(b) by 481 days.

(21) Appl. No.: 13/829,285

(22) Filed: Mar. 14, 2013

(65) Prior Publication Data

US 2014/0063582 A1     Mar. 6, 2014

Related U.S. Application Data

(60) Provisional application No. 61/696,458, filed on Sep. 4, 2012.

(51) Int. Cl.
*G02F 1/03* (2006.01)
*G02F 1/07* (2006.01)
(Continued)

(52) U.S. Cl.
CPC ......... *G02B 5/208* (2013.01); *B32B 17/10055* (2013.01); *C03C 17/36* (2013.01); *C03C 17/366* (2013.01); *C03C 17/3642* (2013.01);
(Continued)

(58) Field of Classification Search
CPC .......... G05B 5/23; G02B 5/008; G02B 5/23; G02B 1/04; G02F 1/13; G02F 1/0126; G02C 7/102

USPC ....... 359/241, 350, 353, 359, 360, 885, 888, 359/889, 892
See application file for complete search history.

(56) References Cited

U.S. PATENT DOCUMENTS

| 3,682,528 A | 8/1972 | Apfel et al. |
| 4,081,934 A | 4/1978 | Franz |

(Continued)

FOREIGN PATENT DOCUMENTS

JP     2012/057304     3/2012

OTHER PUBLICATIONS

International Search Report mailed Feb. 21, 2014 which issued in corresponding International Patent Application No. PCT/IB2013/001915 (7 pages).

(Continued)

*Primary Examiner* — Bumsuk Won
*Assistant Examiner* — Tamara Y Washington (57) ABSTRACT

An energy efficient optical window has different optical properties when irradiated by solar light from front or back side of the window. The window is used to reflect most of the infrared light at summer times, leaving the interior cooler and to absorb most of the infrared light at winter times, making the interior hotter by heat transfer from the hot window pane. Mechanical reversal of the window, inside out, is used to apply the needed version for winter and summer. The window is coated with alternating thin metallic and dielectric layers that transmit most of the visible light while reflecting most of the infrared part of the spectrum when impinged by solar light on one side and transmit most of the visible light while absorbing most of the infrared part of the spectrum when impinged by solar light on the other side.

8 Claims, 8 Drawing Sheets

(51) Int. Cl.
*G02B 5/20* (2006.01)
*C03C 17/36* (2006.01)
*G02B 5/22* (2006.01)
*G02B 5/28* (2006.01)
*B32B 17/10* (2006.01)
*E06B 3/00* (2006.01)
*F24J 2/00* (2014.01)

(52) U.S. Cl.
CPC ....... C03C17/3644 (2013.01); C03C 17/3649 (2013.01); E06B 3/00 (2013.01); G02B 5/22 (2013.01); G02B 5/282 (2013.01); C03C 2217/43 (2013.01); C03C 2217/475 (2013.01); C03C 2217/48 (2013.01); C03C 2217/74 (2013.01); C03C 2218/365 (2013.01); F24J 2/0007 (2013.01)

(56) References Cited

U.S. PATENT DOCUMENTS

| | | | |
|---|---|---|---|
| 4,179,181 A | 12/1979 | Chang | |
| 4,235,048 A | 11/1980 | Gillery | |
| 4,368,945 A * | 1/1983 | Fujimori | B32B 17/10 359/360 |
| 4,799,745 A | 1/1989 | Meyer et al. | |
| 5,557,462 A | 9/1996 | Hartig et al. | |
| 5,925,453 A * | 7/1999 | Kase | B32B 17/10009 428/323 |
| 6,262,830 B1 | 7/2001 | Scalora | |
| 7,817,328 B2 * | 10/2010 | Millett et al. | 359/288 |
| 2006/0154049 A1 | 7/2006 | Padiyath | |
| 2012/0099188 A1 | 4/2012 | Akozbek et al. | |

OTHER PUBLICATIONS

International Written Opinion mailed Nov. 26, 2012 which issued in corresponding International Patent Application No. PCT/IB2013/001915 (10 pages).

* cited by examiner

Summer configuration

Visible light transmittance = 50.0%; IR reflectance = 82.6%; IR absorbance = 7.4%.
Reflectance and transmittance are presented by thick and thin lines, respectively.

FIG. 6

Winter configuration.
Visible light transmittance = 50.0%; IR reflectance = 42.3%; IR absorbance = 47.7%.
Reflectance and transmittance are presented by thick and thin lines, respectively

GLAZING DESIGN WITH VARIABLE HEAT AND LIGHT TRANSMITTANCE PROPERTIES, DEVICE AND METHOD

CROSS-REFERENCE TO RELATED APPLICATIONS

This application claims the benefit of U.S. Provisional Application No. 61/696,458, filed Sep. 4, 2012, which is incorporated by reference herein in its entirety. This application is related to U.S. application Ser. No. 13/759,756, filed Feb. 5, 2013; U.S. application Ser. No. 13/771,714, filed Feb. 20, 2013, the disclosures of each of these applications being incorporated by reference herein in their entireties.

FIELD OF THE INVENTION

The present invention relates to an energy efficient optical window having different optical properties when irradiated by solar light from the front or backside of the windowpane. The window is used to reflect most of the infrared light at summer times, leaving the interior of the room cooler and to absorb most of the infrared light at winter times, making the interior warmer by heat transfer and thermal radiation from the hot window pane. Mechanical flipping of the window, inside out, is used to apply the needed version for winter and summer. The window is coated with alternating thin metallic and dielectric layers that transmit most of the visible light while reflecting most of the infrared part of the spectrum when impinged by solar light on one side and that transmit most of the visible light while absorbing most of the infrared part of the spectrum when impinged by solar light on the other side of the window pane.

It is a further object of the present invention to provide a self-adaptive visible light filter that changes its visible light transmittance on demand in presence of solar light. The filter is made asymmetric by implementing a photochromic material on one side and a UV absorbing material on the other side.

BACKGROUND

Many modern buildings have large windows used for better lighting of the interior. These windows, made of glass, let through the visible as well as a large part of the infrared solar light into the building, which affects the temperature inside the building. Although the infrared radiation helps to reduce heating expenses during winter, it adds more heat that needs to be removed by air conditioning in summer times. Solar light (or sunlight) includes UV light (including UVC, UVB, and UVA light), visible light, and infrared light. From an energy saving point of view, it would be wise to reflect the infrared light in summer times and to absorb the infrared light in winter.

In the past, there have been attempts to realize smart passive windows that are infrared reflecting. Conventional systems do not teach a window-filter that has both absorbing properties and that can reflect the infrared light in summer (warmer) temperatures and, when turned around, absorb the infrared light in winter (colder) temperatures.

Energy saving, passive, reversible window-filters that are coated with alternating thin metallic and dielectric layers that transmit most of the visible light while reflecting most of the light in the infrared part of the spectrum when impinged by solar light on one side and transmit most of the visible light while absorbing most of the light in the infrared part of the spectrum when impinged by solar light on the other side are a real need.

SUMMARY

It is therefore a broad object of the present invention to provide a passive filter that is coated with alternating thin metallic and dielectric layers that transmit most of the visible light while reflecting most of the infrared part of the spectrum when impinged by solar light on one side and transmit most of the visible light while absorbing most of the infrared part of the spectrum when impinged by solar light on the other side.

It is a further object of the present invention to provide a passive filter that is coated with alternating thin metallic and dielectric layers that transmit most of the visible light while reflecting most of the infrared part of the spectrum when impinged by solar light on one side and transmit most of the visible light while absorbing most of the infrared part of the spectrum when impinged by solar light on the other side. This window can be mechanically reversed to accommodate both cool and hot weather, thus using the same filter and changing only the light impingement direction for cool or hot weather.

It is a further object of the present invention to provide a passive filter that is coated by alternating thin metallic and dielectric layers that transmit most of the visible light while blocking most of the infrared part of the spectrum.

It is a further object of the present invention to provide a passive filter that is coated by alternating thin metallic layers. These layers have an average thickness that is much smaller than the light wavelength, e.g., about 10 nm and can be made of or can include, e.g., low cost materials like Ag, Cu, or Al, or high cost materials like Au, or any combination thereof, that inherently reflect efficiently near infrared radiation. The metallic layers including Ag, Cu, Al, or Au, or any combination thereof, may include elemental metals Ag, Cu, Al, Au. According to other aspects of the present invention, other suitable materials or combinations of materials that inherently reflect efficiently near infrared radiation may be used. The metals that are useful for these applications possess high reflectivity in the visible and IR spectrum.

It is a further object of the present invention to provide a passive filter that is coated by alternating thin metallic layers having dielectric layers between them. The dielectric layers can be made of or can include, e.g., $SiO_2$, $Al_2O_3$ or $MgF_2$, or any combination thereof, where these layers act as spacers between the metal layers. According to other aspects of the present invention, other suitable dielectric layers may be used, e.g., metal oxides, polymers, sol-gels, or any combinations of the above. Coating methods include, e.g., spin/dip coating of solutions for materials as polymers or sol-gel or vacuum coating for metal oxides. By carefully selecting the dielectric thickness, e.g., in the range of about 50 to about 100 nm thickness, the attenuation of visible light transmittance is minimized via destructive interference of the reflected visible light. The thickness of the dielectric layers may vary depending on their position with respect to other layers and their refractive index.

It is a further object of the present invention to provide a passive filter that is coated by alternating thin metallic layers having dielectric layers between them. The filter is made asymmetric by implementing an infrared absorbing layer on the side facing the sun in winter times or cool weather.

It is a further object of the present invention to provide a passive filter that is coated by alternating thin metallic layers having dielectric layers between them. The filter is made asymmetric by implementing an infrared absorbing layer on the side facing the interior of the room, where no infrared radiation from the sun is present, in summer times or hot weather.

It is a further object of the present invention to provide a passive filter that is coated by alternating thin metallic layers having dielectric layers between them. Adhesion between adjacent layers is enhanced by thin, few nanometers, e.g. between about 0.5 to about 5 nm thick, deposition of NiCr or similar substances including Ni, Cr, Ti, $TiO_2$ SiN, or any combination thereof.

It is a further object of the present invention to provide a passive filter that is coated by alternating thin metallic having dielectric layers between them and an infrared absorbing layer on the side facing the sun in winter times that is applied to windows or to blinds, such as venetian blinds, that allow the user to control which side of the window will be facing the sun.

In one implementation, the infrared absorbing layer includes a transparent dielectric material including embedded nanoparticles of, e.g., $LaB_6$ (Lanthanum hexaboride), near infrared absorbing dyes having high or very high absorptivity (e.g., around 50 to 200 $Lg^{-1}cm^{-1}$) including Epolight™ 5547 (supplied by Epolin, Inc.), carbon, ITO (tin-doped indium oxide), ATO (antimony-doped tin oxide), vanadium oxide, and any combination thereof, and an infrared reflecting layer includes alternating metallic and dielectric layers. Epolight™ 5547 is a near infrared dye that is suitable for coatings, laminates and acrylic thermoplastics and having a very high absorptivity. Epolight™ 5547 is a reddish-brown powder having an absorption maximum, $\lambda$ max of 907 nm and an absorptivity in acetone of 204 $L\ g^{-1}\ cm^{-1}$ and a melting point between 224-227° C. According to one embodiment, the metallic layers are nanometric layers of at least one metal selected from silver, copper, aluminum, gold, and any combination thereof, and the dielectric layers include at least one material selected from $SiO_2$, $Al_2O_3$, and $MgF_2$, and any combination thereof, the dielectric layers having thicknesses that cause the metallic layers to reflect near infrared light.

One aspect of the present invention relates to an energy efficient optical window having different optical properties when irradiated by solar light from opposite sides. The window includes a first side and a second side opposite the first side. The window is movable between a first position wherein the solar light impinges on the first side and a second position wherein the solar light impinges on the second side. The window includes an infrared absorbing layer proximate the first side and configured to (a) absorb at least a major portion of near infrared light impinging on the infrared absorbing layer and (b) transmit at least a major portion of the visible light impinging on the infrared absorbing layer. The window also includes an infrared reflecting layer proximate the second side and configured to (a) reflect at least a major portion of the near infrared light impinging on the infrared reflecting layer and (b) transmit at least a major portion of the visible light impinging on the infrared reflecting layer. The window additionally includes at least one transparent layer coupled to the infrared absorbing layer and the infrared reflecting layer.

According to a further aspect of the present invention, the energy efficient optical window also includes a second transparent layer. The at least one transparent layer is separated from the second transparent layer by a separating layer. The separating layer includes air, vacuum or inert gas. The infrared layer is in direct contact with the at least one transparent layer and the infrared reflecting layer is in direct contact with the second transparent layer.

A further aspect of the present invention relates to a method of controlling the transmission of solar light through an energy efficient optical window that has different optical properties when irradiated by solar light from opposite sides. The method includes positioning the window to either absorb at least a major portion of near infrared light impinging on an infrared absorbing layer positioned proximate a first side of said window while transmitting at least a major portion of the visible light through said infrared absorbing layer, or reflect at least a major portion of the near infrared light impinging on an infrared reflecting layer positioned proximate a second side of the window while transmitting at least a major portion of the visible light impinging on said second side of the window.

Another aspect of the present invention relates to a Venetian blind system comprising a plurality of the energy efficient optical windows. Each one of the energy efficient optical windows of forms a slat of the venetian blind system. Each slat is movable between a first position, wherein the solar light impinges on a first side of the slat and a second position, wherein the solar light impinges on a second of the slat.

A further aspect of the present invention relates to an energy efficient Venetian blind system having different optical properties when irradiated by solar light from opposite sides. The Venetian blind system includes a plurality of slats, each slat having a first side and a second side opposite the first side. Each slat is movable between a first position wherein the solar light impinges on the first side and a second position wherein the solar light impinges on the second side. Each slat includes an infrared absorbing layer positioned proximate the first side, the infrared absorbing layer being configured to (a) absorb at least a major portion of near infrared light impinging on the infrared absorbing layer and (b) transmit at least a major portion of the visible light impinging on the infrared absorbing layer. Each slat also includes an infrared reflecting layer positioned proximate the second side, the infrared reflecting layer being configured to (a) reflect at least a major portion of the near infrared light impinging on the infrared reflecting layer and (b) transmit at least a major portion of the visible light impinging on the infrared reflecting layer.

According to a further aspect of the present invention, an optical window having different light transmittance when irradiated by solar light from opposite sides includes a photochromic layer, a UV absorbing material layer, and at least one transparent layer. The UV absorbing material layer is positioned proximate a first side of the window. The UV absorbing material layer is configured to absorb a portion of the impinging light having wavelengths in the solar UV spectrum. The photochromic layer is positioned proximate a second side of the window opposite the first side. The photochromic layer is configured to turn darker when exposed to impinging light having wavelengths in the solar UV spectrum. The at least one transparent layer is coupled to the photochromic layer and the UV absorbing material layer. The window is configured to be movable between a first position wherein the impinging light impinges on the UV absorbing material layer before impinging on the photochromic layer and a second position wherein the impinging light impinges on the photochromic layer before impinging on the UV absorbing material layer. The window is configured to allow visible light to enter through the window with little attenuation when the window is in the first position. The window is configured to block a portion of the visible light from entering through the window when the window is in the second position.

Yet another aspect of the present invention relates to an optical window having different light transmittance when irradiated by solar light from opposite sides. The window includes a first side and a second side opposite the first side. The window is movable between a first position wherein the solar light impinges on the first side and a second position wherein the solar light impinges on the second side. The window includes a photochromic layer, an infrared absorbing layer, an infrared reflecting layer, and a UV absorbing material layer. The UV absorbing material layer is positioned proximate the first side. The UV absorbing material layer is configured to absorb a portion of the impinging light having wavelengths in the solar UV spectrum. The infrared absorbing layer is positioned proximate the first side. The infrared absorbing layer is configured to (a) absorb at least a major portion of the near infrared light impinging on the infrared absorbing layer and (b) transmit at least a major portion of the visible light impinging on the infrared absorbing layer. The infrared reflecting layer is positioned proximate the second side. The infrared reflecting layer is configured to (a) reflect at least a major portion of the near infrared light impinging on the infrared reflecting layer and (b) transmit at least a major portion of the visible light impinging on the infrared reflecting layer. The photochromic layer is positioned proximate the second side. The photochromic layer is configured to turn darker when exposed to impinging solar light having wavelengths in the solar UV spectrum. The window is configured to be movable between a first position wherein the impinging light impinges on the UV absorbing material layer before impinging on the photochromic layer and a second position wherein the impinging light impinges on the photochromic layer before impinging on the UV absorbing layer. The window is configured to allow visible light to enter through the window with little attenuation when the window is in the first position. The window is configured to block a majority portion of the visible light from entering through the window when the window is in the second position.

A pivoting support may be provided for the window so that the window can be positioned to have either the first side or the second side facing incoming solar light. According to other aspects of the present invention, the window may be provided with other suitable means for easily positioning either side of the window to face incoming solar light from the outside.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
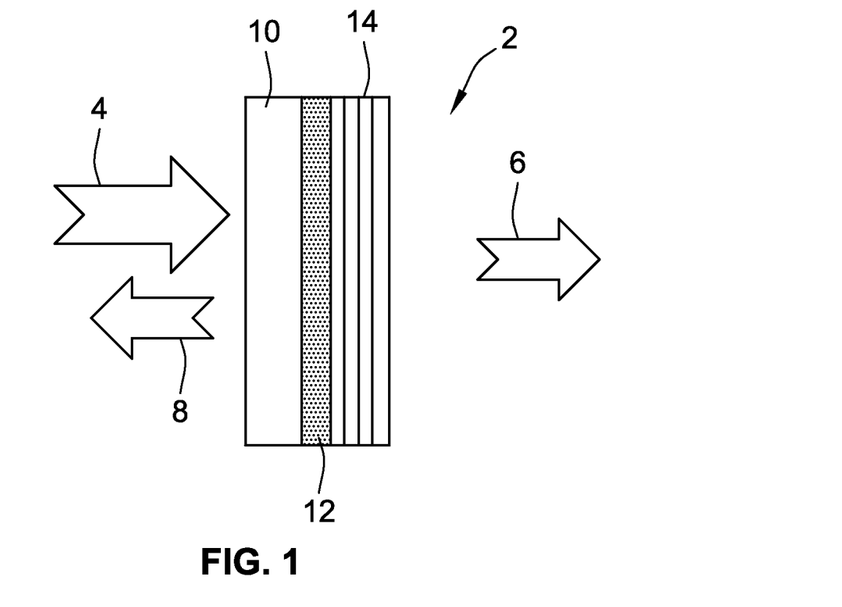
FIG. 1 illustrates a schematic, single window-filter assembly showing a winter position.

Referring now to FIG. 1, there is shown a schematic, single window-filter assembly 2 showing a winter position. The single window-filter assembly looks from the outside and from the inside like a regular window. The single window-filter assembly may be configured to have any suitable thickness. The winter position is generally useful for colder temperatures, which refers to temperatures where the temperatures outside are below the desired temperatures indoors. Winter temperatures may refer to temperatures colder than about 10-15° C.

Solar light 4 from the outside impinges on a window of, e.g., transparent glass 10 that transmits both, the visible as well as the near infrared, parts of the solar light through. The material 10 may be constructed out of transparent glass or other suitable material. When the light 4 reaches an infrared absorbing layer 12, which is made of, e.g., transparent dielectric material having embedded nanoparticles or nanotubes of, e.g., $LaB_6$ (Lanthanum hexaboride), near infrared absorbing dyes having high or very high absorptivity including Epolight™ 5547 (supplied by Epolin, Inc.), carbon, ITO, ATO or Vanadium Oxide (VO, $V_2O_3$, $VO_2$, $V_2O_5$, and other vanadium oxides with general formulas described by $V_nO_{2n+1}$, $V_nO_{2n-1}$) nanoparticles or any combination thereof, a part (e.g., between about 40-90%), of the near infrared light (e.g., in the wavelength range of 700 nm to 2500 nm) is absorbed by the infrared absorbing layer 12 and the visible light transmitted to the following infrared reflecting layer 14. The infrared reflecting layer 14 is coated with alternating thin metallic and dielectric layers that transmits between about 30-80%, or, alternatively, more than 50% of the visible light 6 in the wavelength range of between about 400 nm to 700 nm, while reflecting most (e.g., more than about 80%) of the remaining near infrared part in the wavelength range of 700 nm to 2500 nm of the spectrum into the infrared absorbing layer 12. Some of the infrared light is reflected back in the direction 8, specifically between about 5 to about 50% of the infrared light is reflected back in the direction 8, while most of the infrared light is absorbed in the window and transfers to heat.

Figure 1A:
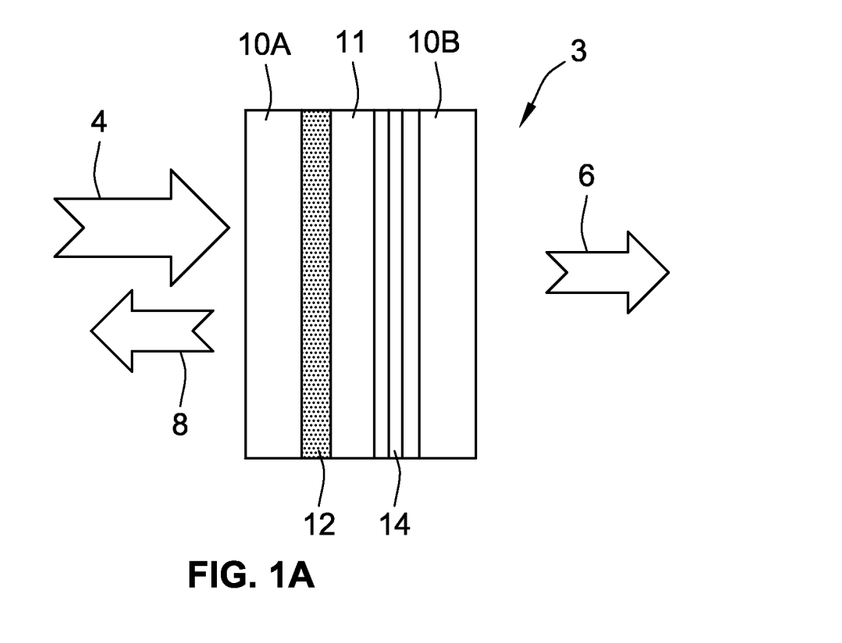
FIG. 1A illustrates a schematic, double-glazed window-filter assembly showing a winter position.

Referring now to FIG. 1A, a double-glazed window-filter assembly 3 is shown in the winter position. The window-filter assembly 3 includes a double-glazed window including a first window pane 10A and a second window pane 10B. The first window pane 10A and the second window pane 10B are separated by a layer 11, which may include air, vacuum or an inert gas such as argon. Solar light 4 impinges on an outside-facing surface of the first window pane 10A. The infrared absorbing layer 12 is positioned/coated onto an inside-facing (in the winter position) surface of the first window pane 10A. The infrared reflecting layer 14 is positioned on an outside-facing surface (in the winter position) of the second window pane 10B. Either a metallic or a dielectric layer of the infrared reflecting layer 14 may be the outermost (in the winter position) layer of the infrared reflecting layer 14. The infrared reflecting layer 14 is coated with alternating thin metallic and dielectric layers that transmits between about 30-80%, or, alternatively, more than 50% of the visible light 6 in the wavelength range of between about 400 nm to about 700 nm, while reflecting most (e.g., more than about 80%) of the remaining near infrared part in the wavelength range of about 700 nm to about 2500 nm of the spectrum into the infrared absorbing layer 12. Some of the infrared light is reflected back in direction 8, between 5 to 50%, while most of it is absorbed in the window and transfers to heat.

Although FIG. 1A illustrates the infrared absorbing layer 12 being positioned on the inside-facing (in the winter position) surface of the first window pane 10A and the infrared reflecting layer 14 being positioned on the outside-facing surface (in the winter position) of the second window pane 10B, it is understood that the infrared absorbing layer 12 may also be positioned on the inside or the outside-facing surface of the window pane 10A or 10B and that the infrared reflecting layer 14 may be positioned on the inside or the outside-facing surface of the window pane 10A or 10B, as long as the solar light 4 impinges on the infrared absorbing layer 12 prior to impinging on the infrared reflecting layer 14 in the winter position. Furthermore, the infrared absorbing layer 12 and the infrared reflecting layer 14 may be positioned on different surfaces (outside and inside-facing) of the same window pane. As such, the infrared absorbing layer 12 may be positioned on the outside-facing surface (in the winter position) of the second window pane 10B and the infrared reflecting layer 14 may be positioned on the inside-facing surface (in the winter position) of the second window pane 10B. Thus, the solar light 4 impinges on the first window pane 10A, then passes through layer 11, then impinges on infrared absorbing layer 12, then passes through second window pane 10B, and then impinges on the infrared reflecting layer 14. Although the window-filter 3 is shown in the winter position in FIG. 1A, it is understood that the window-filter 3 is simply rotated to achieve the summer position, wherein the order of the layers is the reverse of that shown and described in relation to FIG. 1A.

Referring now to FIGS. 1 and 1A, after partial absorption in the infrared absorbing layer 12 and reflection from the infrared reflecting layer 14, the remaining near infrared light leaves the window (10, 10A or 10B depending on the implementation) in direction 8, while most (e.g., more than about 50%) or, alternatively, between about 30 and about 80% of the visible light passes through in direction 6. Since the near infrared solar light is passing twice, back and forward in the infrared absorbing layer 12, it is heated; that makes the whole window hotter when the window is impinged by the solar light, and part of this heat is added to the room temperature, replacing part of the heating needed in winter time.

Figure 2:
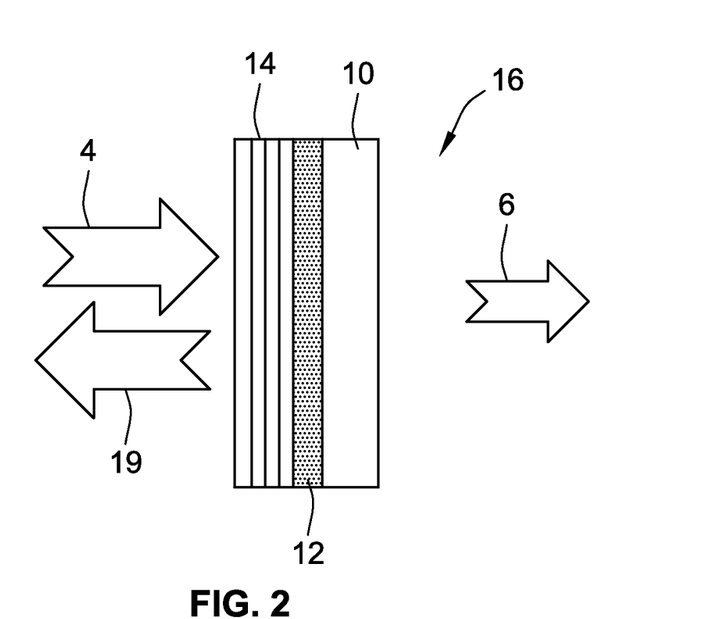
FIG. 2 is a schematic, single window-filter assembly showing a summer position.

In FIG. 2, schematics are shown of a single window-filter assembly 16 in summer position. The summer position is generally useful when it is desired that the interior be cooled. Generally, the summer position may be useful when temperatures outside are above about 25° C. The solar light 4 impinges on a window meeting the infrared reflecting layer 14 that is coated with alternating thin metallic and dielectric layers that transmit most of the visible light (e.g., more than about 50%) or, alternatively, between about 30 to 80%, while reflecting most of the remaining near infrared part, e.g. between about 80 to about 99% of the spectrum in direction 19. When the light 4 reaches the infrared absorbing layer 12, which is made of, e.g., transparent dielectric material having embedded nanoparticles or nanotubes of, e.g., $LaB_6$ (Lanthanum hexaboride), infrared absorbing dyes having high or very high absorptivity including Epolight™ 5547 (supplied by Epolin, Inc.), carbon, ITO, ATO or Vanadium Oxide ($VO_x$) nanoparticles and any combination thereof, a remaining small part of the near infrared light (e.g., between about 20 and 1%, or less) that passed through the infrared reflecting layer 14 is absorbed by the infrared absorbing layer 12, and the visible light is transmitted inside the room in direction 6. This visible light passes through transparent glass 10 that transmits both, the visible as well as the near infrared, parts of the solar light through but in this case only visible light leaves in direction 6. Here, between about 80 to 99% of the near infrared solar light is reflected by layers 14 and only a minute amount residual e.g., between about 1 to about 20% is absorbed in the infrared absorbing layer 12, making the whole window stay cold when impinged by the solar light, where only visible light in direction 6 enters the room interior, thus reducing heat loads that have to be removed from the interior by air conditioning. The window in the summer position may be a double-glazed window as discussed in relation to FIG. 1A, where all the elements are arranged in reverse order from that shown in FIG. 1A; thus any elements that are listed as "outside-facing" in the winter position are "inside-facing" in the summer position and vice versa.

Figure 3:
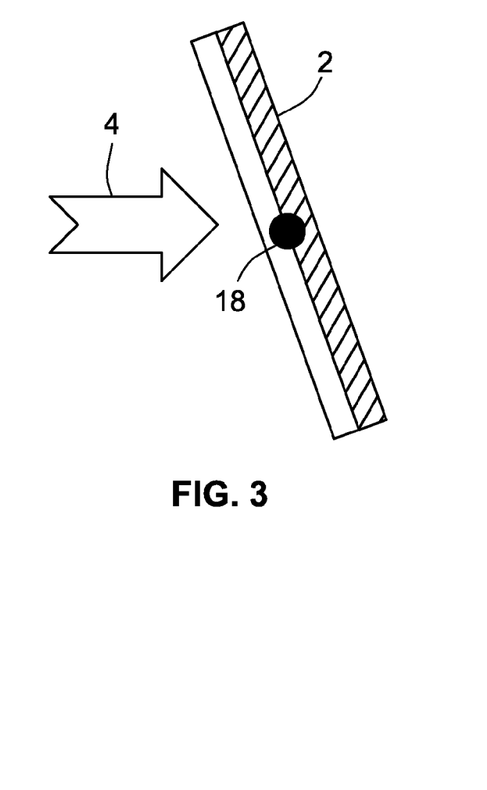
FIG. 3 is a schematic, window-filter assembly showing the switching between summer-winter positions by turning on a pivot.

FIG. 3 is a schematic, window-filter assembly showing the switching between summer-winter positions by turning on a pivot. Here, the window 2 is the same window-filter described in FIG. 1 or 1A and when reversed—as described in FIG. 2. The window 2 (or 3, not shown) here is pivoted on a hinge 18, enabling quick change from summer to winter position, exposing the window to solar light 4 in winter position as shown in FIG. 1 or 1A, or as shown in summer position as shown in FIG. 2. The window 2 or 3 may be rotated about a horizontal and/or about a vertical axis. After being turned to the winter or the summer position, the window 2 or 3 is tightly sealed into its frame. According to one aspect of the present invention, a user is able to open the window 2 or 3 to a desired extent to the outside in either the winter or the summer position (for example, to let air from the outside in).

Figure 4:
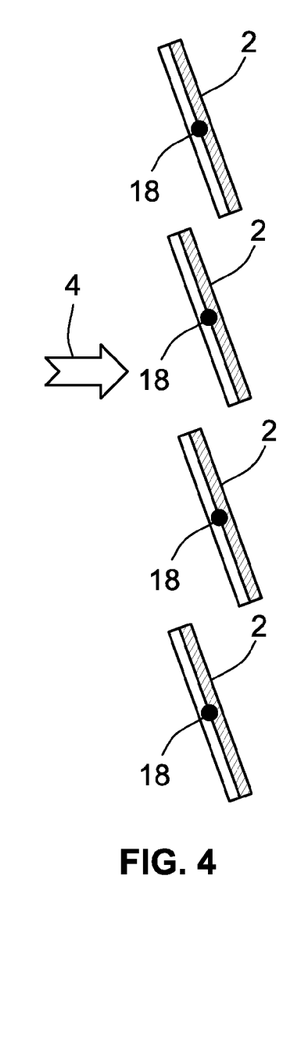
FIG. 4 is a schematic, venetian blind window-filter assembly showing the two, summer-winter positions switching by turning on a pivot.

FIG. 4 illustrates a similar device to that shown in FIG. 3. However, the mechanical movement of the window-filter reversal is a venetian blind window-filter assembly, operated by a handle. The switching between summer-winter positions is carried out by turning on a pivot. Here the window 2 is the same window-filter described in FIG. 1 (or it could be the window-filter 3 described in FIG. 1A) and when reversed in FIG. 2 where window 2 here is pivoted on a hinge 18, enabling quick change from summer to winter position, exposing the window to solar light 4 in winter position as shown in FIG. 1 or 1A, or as shown in summer position in FIG. 2. According to one aspect of the present invention, the venetian-blind filter assembly shown in FIG. 4 may be used instead of or as the window. Proper insulation is provided between each tier of the venetian blinds system to ensure that whether the venetian blinds are used in the summer or the winter position, each tier is sealed to another tier to achieve optimal savings on heating and air-conditioning.

According to another aspect of the present invention, the venetian blinds system shown in FIG. 4 may not include the window or transparent layer portion but may instead be located proximate a window. In other words, in this embodiment, a regular window is used, and the venetian blinds are hung in the interior or exterior and adjacent to the window. According to this embodiment, the venetian blinds do not include the transparent layer 10, but only include layers 14 and 12, with the infrared absorbing layer 12 facing the window in the winter times and the infrared reflecting layer 14 facing the window in the summer times.

Figure 5:
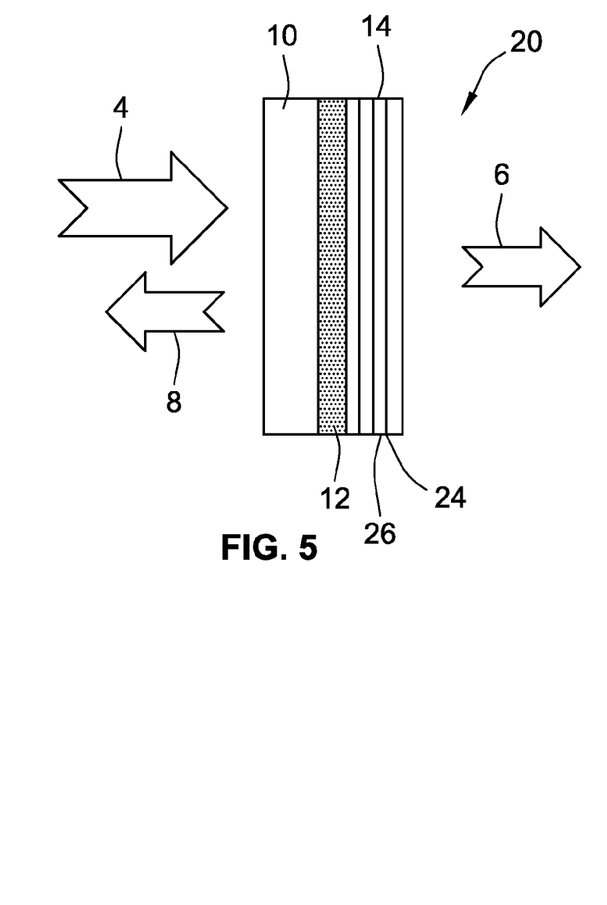
FIG. 5 is a schematic cross-section view of the infrared reflecting layer structure of the window-filter assembly.

FIG. 5 shows a schematic cross-section view of the layer structure of the window-filter assembly 20 in further detail. The solar light 4 impinges on a window made of, e.g., transparent glass 10 that transmits both the visible as well as the near infrared parts of the solar light through. When the light 4 reaches the infrared absorbing layer 12, which is made of, e.g., transparent dielectric material including embedded nanoparticles or nanotubes of, e.g., $LaB_6$ (Lanthanum hexaboride), near infrared absorbing dyes having high or very high absorptivity including Epolight™ 5547 (supplied by Epolin, Inc.), carbon, ITO, ATO or Vanadium Oxide ($VO_x$) nanoparticles or any combination thereof, part of the near infrared light is absorbed by the infrared absorbing layer 12, and the visible light is transmitted to the interior of the room. The following infrared reflecting layer 14 is an infrared reflecting layer that is coated with alternating thin metallic and dielectric layers that transmit most of the visible light while reflecting most of the remaining near infrared part of the spectrum into the infrared absorbing layer 12. The infrared reflecting layer 14 consists of dielectric layers 26 coated by alternating thin metallic layers 24; these metallic layers 24 can be thin, nanometric layers made of or including, e.g., Ag, Cu, Al or Au that inherently reflect efficiently near infrared radiation. The dielectric layers 26 can be made of or include, e.g., $SiO_2$, $Al_2O_3$ or $MgF_2$ where these layers act as spacers between the metallic layers. The dielectric layers 26 may be made of, e.g., metallic oxide, polymers, sol-gel, or any combinations of the above. Coating methods include, e.g., spin/dip coating of solutions for materials such as polymers or sol-gels, vacuum coating for metal oxides, and other suitable methods.

By carefully selecting the dielectric thickness of layers 26, e.g., in the range of about 50 to about 100 nm thickness, the transmittance of visible light is increased via destructive interference of the reflected visible light, and near infrared light is efficiently reflected. The near infrared light that is reflected in direction 8 by the infrared reflecting layer 14, after partial absorption in the infrared absorbing layer 12, leaves the window in direction 8. Most of the visible light passes through in direction 6. Since the near infrared solar light is passing twice, back and forward in the infrared absorbing layer 12 it is heated, making the whole window hotter when impinged by the solar light, and part of this heat is added to the room temperature, replacing part of the heating needed in winter time. The window-filter is reversible as shown in FIG. 3 where the window-filter is made asymmetric by implementing an infrared absorbing layer on the side facing the sun in winter times or cool weather and facing the interior of the room in summer times.

According to one aspect of the present invention, at least one dielectric layer of the infrared reflecting layer 14 includes nanoparticles or nanotubes as discussed above embedded therein. According to a further aspect of the present invention, the infrared reflecting layer 14 includes more than one dielectric layer, and some of the dielectric layers have nanoparticles or nanotubes as discussed above embedded therein, while some of the dielectric layers do not have nanoparticles or nanotubes embedded therein. According to certain aspects of the present invention, the dielectric layer 26 is the outermost layer of the infrared reflecting layer 14 in the winter position shown in FIG. 5, such that the solar light from the infrared absorbing layer 12 impinges directly on the dielectric layer 26 first, as the metallic layer 24 is usually sensitive to the environment. The outermost dielectric layer 26 of the infrared reflecting layer 14 may or may not include nanoparticles or nanotubes embedded therein. According to other aspects of the present invention, the metallic layer 24 may be the outermost layer of the infrared reflecting layer 14 facing the outside in the winter position, wherein the solar light 4 from the infrared absorbing layer 12 impinges first on the metallic layer 24. The outermost layer of the infrared reflecting layer 14 in the summer position may be metallic or dielectric FIG. 6 describes the transmission curve and reflection curve of the window-filter assembly shown in FIG. 2 when used in summer time. The design includes two Ag layers of thicknesses between about 5 and about 20 nm, separated by a dielectric layer of thickness of about 140 nm and a second dielectric layer (facing the outside) having $VO_2$ nanoparticles embedded therein. Here, this example achieves visible light transmittance of 50.0%, near infrared reflectance of 82.6% and very small near infrared absorbance of 7.4%.

Figure 6:
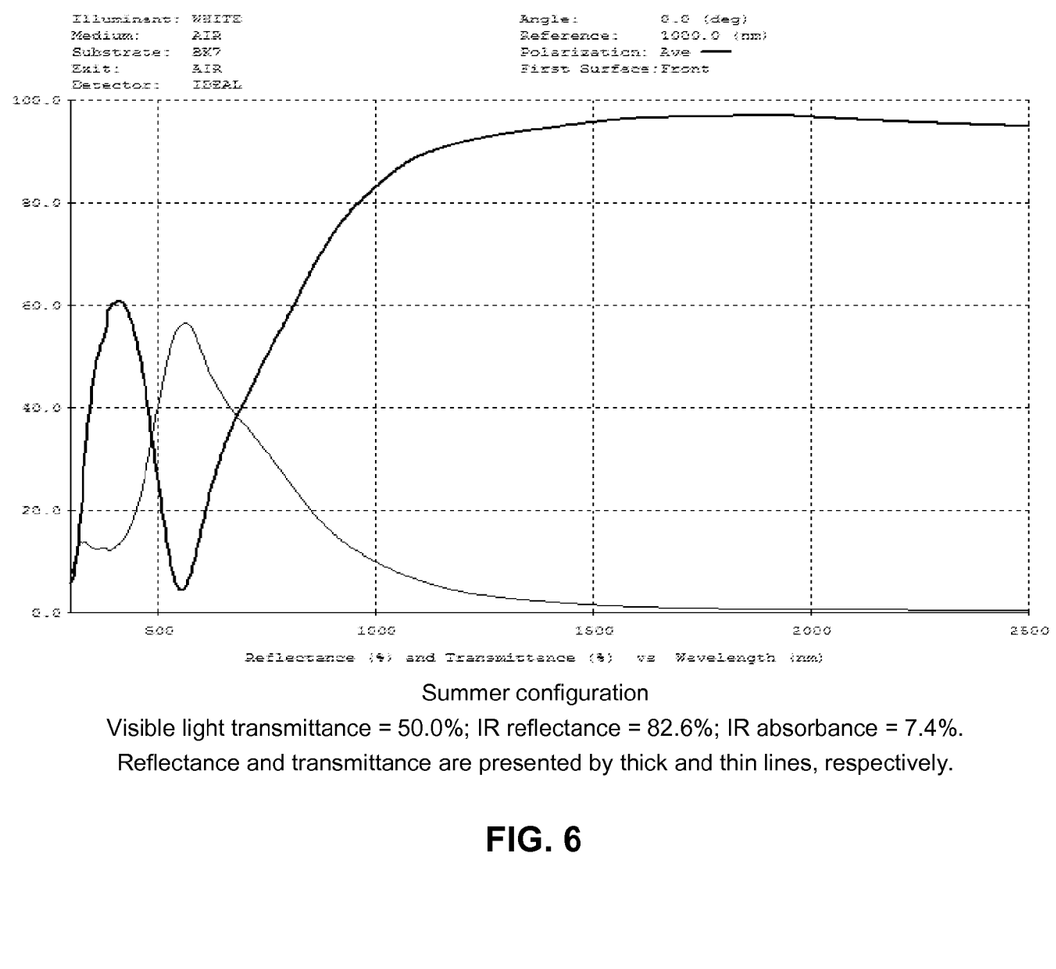
FIG. 6 is the transmission curve and reflection curve of the window-filter assembly when used in summer time.
Figure 7:
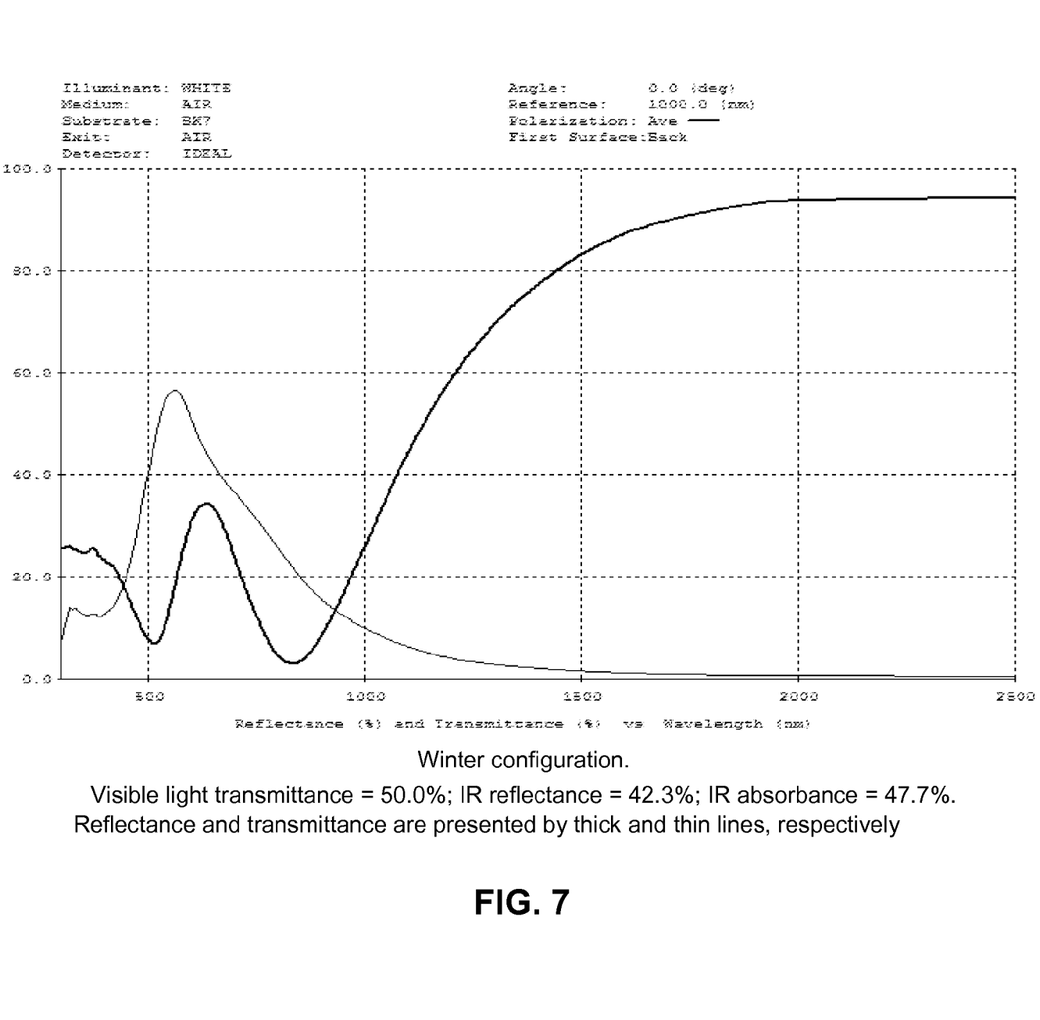
FIG. 7 is transmission, absorption and reflection curves of the window-filter assembly when used in winter time.

FIG. 7 shows the transmission, absorption and reflection curves of the window-filter assembly discussed in relation to FIG. 6 when used in winter time. The window-filter achieves a visible light transmittance of 50.0%; near infrared reflectance of 42.3% and high near infrared absorbance of 47.7%.

Figure 8:
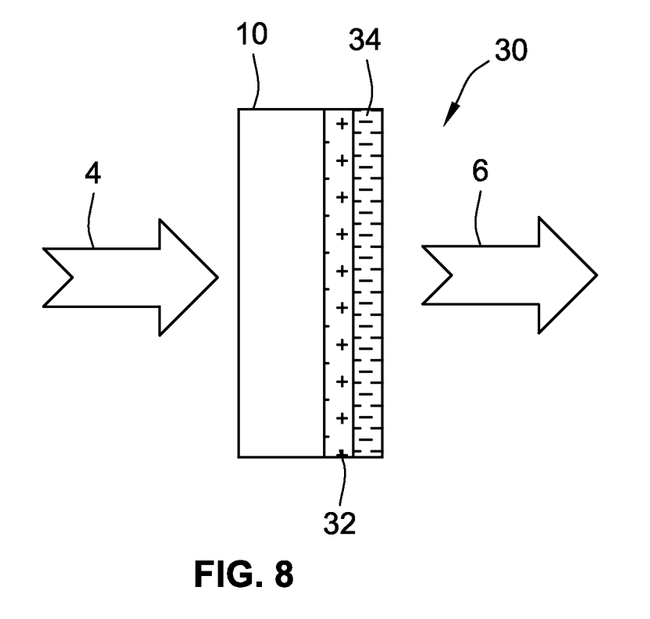
FIG. 8 is a schematic, single window-photochromic filter assembly showing a transparent window position.
Figure 9:
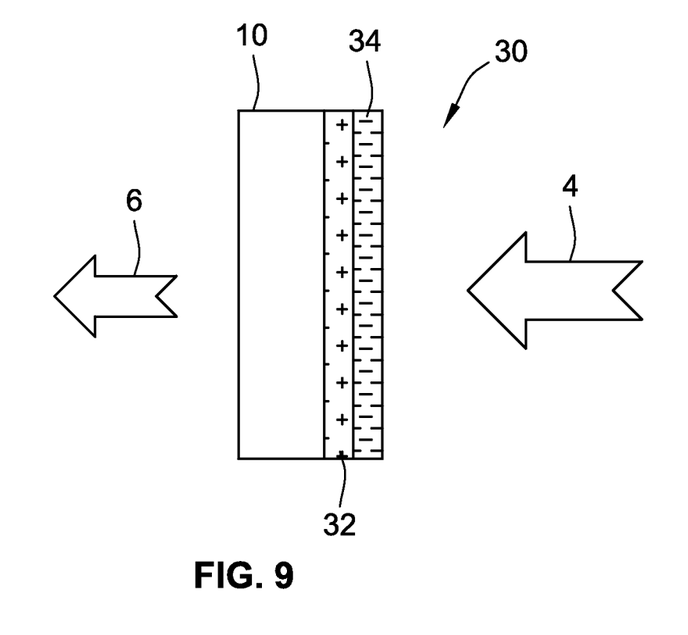
FIG. 9 is a schematic, single window-photochromic filter assembly showing a tinted (dark) window position.

Another aspect of the present invention relates to a self-adaptive visible light filter 30 of FIGS. 8-9 that changes its visible light transmittance on demand in presence of solar light. The window-filter 30 is made asymmetric by implementing a photochromic material 34 on one side of a window and a UV absorbing material layer 32 on the other side of the window. The photochromic material 34 turns darker when exposed to the UV part of the spectrum in the solar radiation. The photochromic material 34 regains its transparency within seconds, or a few minutes, after the UV radiation is blocked or stopped. On a sunny day, one can control the visible light transmittance of the window-filter 30 by choosing which side is the one facing inside of the room and which side faces the outside. When the photochromic material 34 side faces the outside as shown in FIG. 9, the UV solar light activates the photochromic material 34, hence turning the window-filter 30 darker. Less visible light enters the room and the window-filter 30 helps reducing glare. When there is a demand for more solar visible light inside the room, the window-filter 30 can be flipped so that the UV absorbing material layer 32 faces the outside as shown in FIG. 8. In this case, the visible light is transmitted through the window-filter 30 with very low attenuation since the UV radiation is blocked, thus preventing the activation of the photochromic material 34.

According to one aspect of the present invention, when the photochromic layer 34 faces the outside as shown in FIG. 9, the window-filter 30 is configured to block between about 50 and about 90% of visible light from passing through the window-filter 30. According to a further aspect of the invention, when the UV absorbing material 32 faces the outside as shown in FIG. 9, between about 5 and about 30% of the visible light is attenuated, and the rest of the visible light passes through the window-filter 30. The UV absorbing material 32 includes any material configured to absorb light in the UV spectrum, including Uvinul® 3039 (2-Ethylhexyl-2-cyano-3,3-diphenylacrylate from BASF), Tinuvin® 328 (2-(2H-benzotriazol-2-yl)-4,6-di-tert-pentyl-phenol from BASF), Cyasorb® UV-2337 (2-(2'-Hydroxy-3',5'-di-t-amylphenyl) benzotriazole from Cytec Industries), Eversorb 74 (2-(2H-benzotriazol-2-yl)-4,6-di-tert-pentyl-phenol from Everlight Chemical) and other materials having similar UV absorbance properties.

FIG. 8 illustrates a schematic cross-section view of the layer structure of the window-filter assembly 30 in further detail. The solar light 4 impinges on a window made of, e.g., transparent glass 10 that transmits the visible as well as the near infrared and UV parts of the solar light through. When the light 4 reaches the UV absorbing layer 32, the UV part of the solar light is absorbed by the UV absorbing layer 32, and the photochromic layer 34 stays transparent. FIG. 9 shows a schematic cross-section view of the layer structure of the window-filter assembly 30 when light travels in the opposite direction from that shown in FIG. 8. The solar light 4 impinges on the photochromic layer 34 first, making it darker due to UV in the solar light. The solar light 4 from the photochromic layer 34 then reaches the UV absorbing layer 32, which eliminates/absorbs any remnants of the UV part of the solar light 4 and leaves the window 30 in direction 6. The photochromic material 34 is configured to reduce up to about 90% of the visible light transmission in the configurations shown in FIG. 9. The UV absorbing layer 32 and the photochromic layer 34 each have thicknesses between about 10-1000 microns.

The window-filter assembly 30 may be constructed as a double-glazed window as discussed in relation to FIG. 1A. Thus, in the position where more visible light is desired inside the room, the UV absorbing 32 layer may be positioned on either the inside or the outside-facing surface of the first or the second window pane, and the photochromic layer 34 may be positioned on either the inside or the outside-facing surface of the first or the second window pane, as long as the solar light 4 impinges on the UV absorbing layer 32 prior to impinging on the photochromic layer 34. Similarly, in the position where less visible light is desired inside the room, the UV absorbing 32 layer may be positioned on either the inside or the outside-facing surface of the first or the second window pane, and the photochromic material 34 may be positioned on either the inside or the outside-facing surface of the first or the second window pane, as long as the solar light 4 impinges on the photochromic layer 34 prior to impinging on the UV absorbing layer 32.

Various photochromic materials that can be used in the photochromic compositions include, but are not limited to, organic and inorganic photochromics and mixtures thereof. Organic photochromic dyes can be pyrans, oxazines, fulgides, fulgimides, diarylethenes and mixtures thereof. These may be a single photochromic compound, a mixture of photochromic compounds, a material comprising a photochromic compound, such as a monomeric or polymeric ungelled solution, and a material such as a monomer or polymer to which a photochromic compound is chemically bonded. Inorganic photochromics may include crystallites of silver halides, cadmium halide and/or copper halide, or any combination thereof. The photochromic layer 34 includes photochromic molecules that can be incorporated in a matrix or in nano/micro capsules within a matrix as discussed in U.S. patent application Ser. No. 13/759,756, filed Feb. 5, 2013, which is incorporated herein by reference in its entirety.

The window-filter assembly 30 may be switched between the two positions shown in FIGS. 8 and 9 as discussed above in relation to FIG. 3. The embodiments shown in FIGS. 8-9 may be incorporated into a Venetian blinds assembly as discussed above in relation to FIG. 4.

Figure 10:
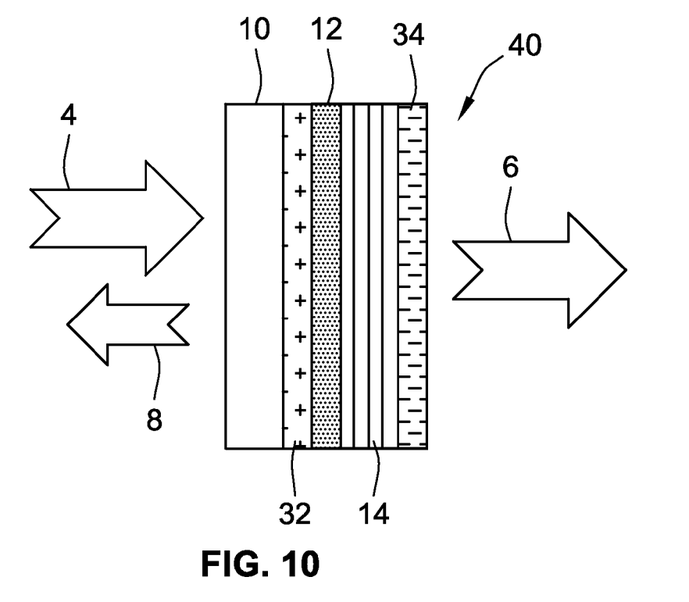
FIG. 10 illustrates a schematic, single window-filter assembly according to a further aspect of the present invention showing a winter position.

Referring now to FIG. 10, a window-filter assembly 40 in a winter position is shown. Solar light 4 from the outside impinges on the transparent glass layer 10 of the assembly 40. After passing through the glass layer 10, the solar light impinges on the UV absorbing layer 32, where the UV part of the solar light is absorbed while the rest of the solar light is allowed to pass through unaffected. After passing though the UV absorbing layer 32, the solar light impinges on the infrared absorbing layer 12, where a part (e.g., between about 40-90%) of the near infrared light (e.g., in the wavelength range of 700 nm to 2500 nm) is absorbed by the infrared absorbing layer 12 and the visible light is transmitted to the following infrared reflecting layer 14, an infrared reflecting layer coated with alternating thin metallic and dielectric layers that transmit between 30-80% or, alternatively, more than about 50% of the visible light in the wavelength range of between about 400 nm to 700 nm while reflecting most of the remaining near infrared part in the wavelength range of 700 nm to 2500 nm back into the infrared absorbing layer 12.

After partial absorption in the infrared absorbing layer 12, the remaining near infrared light leaves the window in direction 8, while most (e.g., more than about 50%) or, alternatively, between about 30 to about 80% of the visible light passes through and impinges on the photochromic layer 34 and passes through in direction 6. When the light reaches the photochromic layer 34, the remaining UV portion of the solar light is negligible (as the UV portion has been absorbed by the UV absorbing layer 32), thus, the photochromic layer 34 is not activated and stays transparent. Since the near infrared solar light is passing twice, back and forward in the infrared absorbing layer 12, it is heated, which makes the whole window hotter when the window is impinged by the solar light 4, and part of this heat is added to the room temperature, replacing part of the heating needed in winter time.

Figure 11:
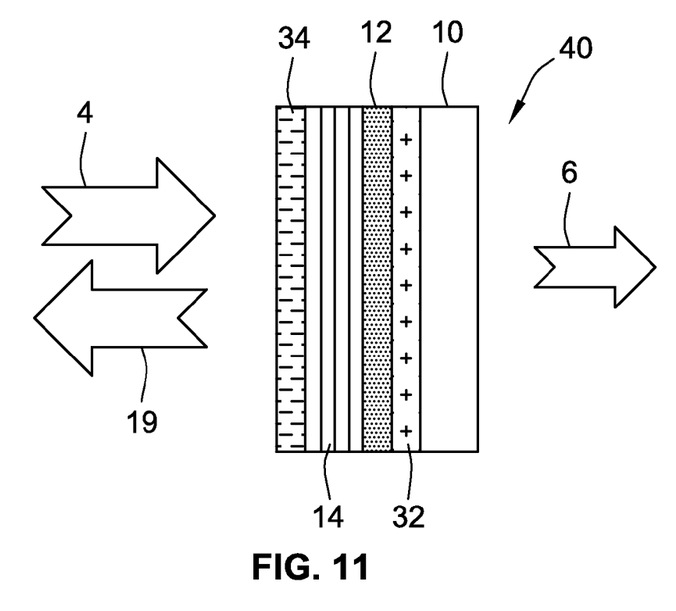
FIG. 11 is a schematic, single window-filter assembly according to a further aspect of the present invention showing a summer position.

Referring now to FIG. 11, the window-filter assembly 40 of FIG. 10 is shown in the summer position. The solar light 4 from the outside impinges on the photochromic layer 34, which causes the photochromic layer 34 to turn less transparent (darker). The solar light 4 then reaches the infrared reflecting layer 14 that is coated with alternating thin metallic and dielectric layers that transmit most of the visible light (e.g., more than about 50%) or, alternatively, between about 30 to about 80%, while reflecting most of the remaining near infrared part, e.g. between about 80 to about 99% of the spectrum in direction 19 (towards the outside). When the light 4 reaches the infrared absorbing layer 12, a small (remaining) part of the near infrared light that came through the infrared reflecting layer 14 is absorbed within the infrared absorbing layer 12, and the visible light is transmitted to the next, UV absorbing layer 32. The layer 32 is a UV absorbing layer, where any remaining UV is absorbed and the remaining light is allowed to pass through transparent glass 10 that transmits both, the visible as well as the near infrared and the UV, parts of the solar light 4 through, but in this case only the visible light leaves in direction 6 as the infrared and the UV portions of the solar light have been absorbed or reflected by the preceding layers. Here, between about 80 to about 99% of the near infrared solar light is reflected by the infrared reflecting layer 14 and only a minute residual amount, e.g., between about 1 to about 20% is absorbed in the infrared absorbing layer 12, making the whole window stay cold when impinged by the solar light 4. Only a portion of visible light, as reduced by the photochromic layer 34 (plus minute amounts, if any, of UV light and IR light not absorbed by the layers 32 and 12, respectively) enters the room interior in direction 6, thus reducing heat loads that have to be removed from the interior by air conditioning. The photochromic layer 34 is configured to reduce up to about 90% of the visible light transmission The materials, properties, thicknesses, and the order for layers 10, 12, 14, 32 and 34 in FIGS. 10-11 may be as described above in relation to FIGS. 1-9. According to one aspect, the order of the layers 10, 12, 14, 32, and 34 in FIGS. 10-11 is as shown in FIGS. 10-11. According to a further aspect, the order of layers 12 and 32 is interchangeable. Accordingly, the order of the layers for the winter position may be, from outside to inside, layer 10, layer 12, layer 32, filter 14, layer 34.

Figure 12:
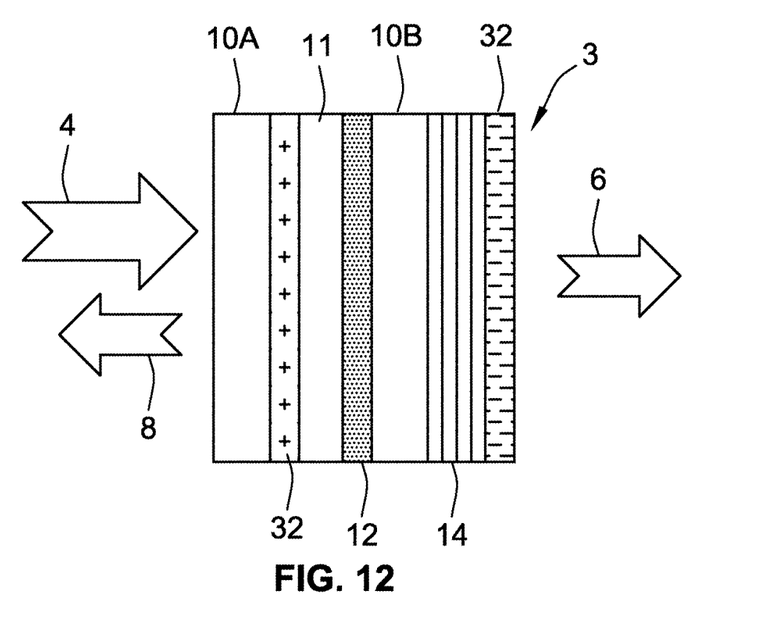
FIG. 12 illustrates a schematic, double-glazed window-filter assembly according to a further aspect of the present invention showing a winter position.

FIG. 12 relates to a double-glazed window-filter assembly 42 in the winter position. The infrared absorbing layer 12 or the UV absorbing layer 32 may be located on same or different surfaces (outside or inside-facing) of the first window pane 10A or the second window pane 10B. The solar light 4 may impinge the infrared absorbing layer 12 before impinging the UV absorbing layer 32, or alternatively, the solar light 4 may impinge the UV absorbing layer 32 before impinging the infrared absorbing layer 12. The infrared reflecting layer 14 may be located on the outside or the inside-facing surface of the first window pane 10A or the second window pane 10B, as long as the solar light impinges the infrared absorbing layer 12 and the UV absorbing layer 32 before impinging the infrared reflecting layer 14 in the winter position. The photochromic layer 34 is positioned either on the outside-facing or the inside-facing surface of the first pane 10A or the second pane 10B, as long as the solar light impinges the infrared absorbing layer 12, UV absorbing layer 32, and the infrared reflecting layer 14 prior to impinging the photochromic layer 34 in the winter position.

According to one aspect of the present invention, the infrared absorbing layer 12 and the UV absorbing layer 32 are positioned on the inside-facing surface (in the winter position) of the first pane 10A and the infrared reflecting layer 14 is positioned on the outside-facing surface (in the winter position) of the second pane 10B. The photochromic layer 34 is positioned either on the outside-facing or the inside-facing surface (in the winter position) of the second pane 10B. For the summer position, the order of the layers is the reverse of that discussed above for the winter position.

The embodiments shown in FIGS. 10-12 may also be incorporated into a Venetian blinds assembly as discussed above.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes, which come within the meaning and range of equivalency of the claims, are therefore intended to be embraced therein.

The invention claimed is:

1. An energy efficient optical window having different optical properties when irradiated by solar light from opposite sides, said window comprising:
   a first side and a second side opposite the first side, wherein the window is movable between a winter position wherein the solar light impinges on the first side and a summer position wherein the solar light impinges on the second side; and
   an infrared absorbing layer and an infrared reflecting layer adjoining each other and having a high transparency for visible light, said absorbing layer absorbing at least about 40 percent of impinging near infrared light, and said infrared reflecting layer reflecting at least about 80 percent of impinging near infrared light.

2. The energy efficient optical window of claim 1 in which said first and second transparent layers are separated from each other by a separation layer of at least one of air, vacuum and inert gas.

3. A method of providing an energy efficient optical window having different optical properties when irradiated by solar light from opposite sides, said method comprising:
   absorbing at least about 40 percent of impinging near infrared light, and
   reflecting at least about 80 percent of impinging near infrared light.

4. The method of claim 3, wherein said absorbing is effected by a transparent dielectric material including embedded nanoparticles of at least one of carbon, vanadium oxide, tin-doped indium oxide, antimony-doped tin oxide, lanthanum hexaboride ($LaB_6$), infrared absorbing dyes having high or very high absorptivity, and any combination thereof.

5. The method of claim 3, wherein said infrared reflecting layer includes a plurality of metallic layers each of which is separated by dielectric layers, each of which has a thickness between about 50 nanometers and about 100 nanometers to increase visible light transmittance by destructive interference of reflected visible light.

6. The method of claim 5 wherein said metallic layers are nanometric layers of at least one metal selected from the group consisting of silver, copper, aluminum, gold, or any combination thereof.

7. The method of claim 3, wherein said dielectric layers include at least one material selected from the group consisting of $SiO_2$, $Al_2O_3$ and $MgF_2$, said dielectric layers having thicknesses that cause said metallic layers to reflect near infrared light.

8. The method of claim 2, wherein said window is pivotably supported and may be positioned to have either said first side or said second side facing incoming solar light.

* * * * *